United States Patent [19]

Zinner

[11] Patent Number: 4,573,832
[45] Date of Patent: Mar. 4, 1986

[54] SINGLE AND MULTIPLE RECESSING TOOL

[75] Inventor: Karl Zinner, Nuremberg, Fed. Rep. of Germany

[73] Assignee: Firma Zinner GmbH, Nuremberg, Fed. Rep. of Germany

[21] Appl. No.: 491,627

[22] Filed: May 5, 1983

[30] Foreign Application Priority Data

May 19, 1982 [DE] Fed. Rep. of Germany ....... 3219019

[51] Int. Cl.⁴ .................. B23B 27/06; B23B 29/22; B23B 29/24; B26D 3/06
[52] U.S. Cl. .................................. 407/70; 407/99; 407/102; 407/107; 407/113
[58] Field of Search ............ 407/70, 71, 69, 68, 407/67, 66, 94, 99, 101, 102, 107, 113

[56] References Cited

U.S. PATENT DOCUMENTS

| 1,336,155 | 4/1920 | Presby | 407/94 |
| 1,396,180 | 11/1921 | Fors | 407/107 |
| 2,142,517 | 1/1939 | Kraus | 407/49 |
| 2,289,155 | 7/1942 | Weidauer | 407/71 |
| 2,497,228 | 2/1950 | Miller | 407/70 |
| 2,498,721 | 2/1950 | Stafford | 407/49 |
| 3,132,542 | 5/1964 | Horvath | 407/113 |
| 3,289,272 | 12/1966 | Stier | 407/101 |
| 3,805,350 | 4/1974 | Stein | 407/113 |
| 4,078,868 | 3/1978 | Erkfritz | 407/48 |

FOREIGN PATENT DOCUMENTS 1044242 11/1953 France ................... 407/68

Primary Examiner—Francis S. Husar
Assistant Examiner—William E. Terrell
Attorney, Agent, or Firm—Jordan and Hamburg

[57] ABSTRACT

Single or multiple recessing tool with cutting plates loosely mounted in an opening of the holder with the cutting plates, possibly using shortened gage block-like supplemental plates, clamped against the bottom and one side wall of the opening by means of an essentially L-shaped mounting frame overlapping the plates of the plate package from above and one side with a clamping pressure component being produced when clamping the mounting frame against the bottom via a wedge ramp lateral to the side wall and with adjusting ribs being arranged on the bottom of the opening and/or the bottom side of the upper clamping leg of the mounting frame engaging into the fitting grooves of all of the plates.

9 Claims, 10 Drawing Figures

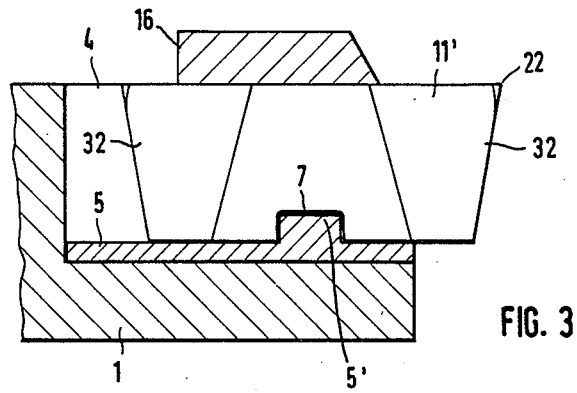
FIG. 3
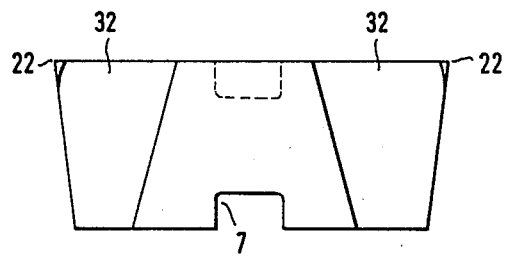
FIG. 4
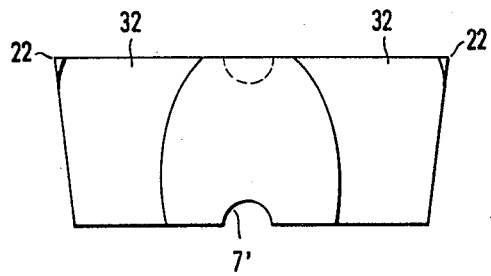
FIG. 5
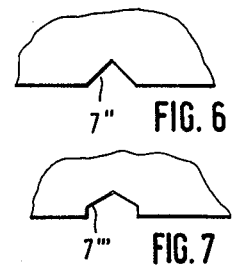
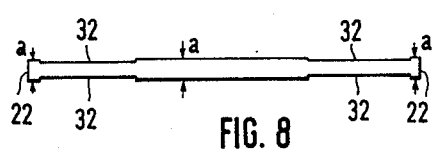
FIG. 8

SINGLE AND MULTIPLE RECESSING TOOL

BACKGROUND OF THE INVENTION

The invention relates to a single and multiple recessing tool with cutting plates loosely mounted in an opening of a holder.

The main problem with similar multiple recessing tools, especially if the system is to operate with reversing plates, has been to assure that the plates can be mounted in a fast and position-accurate fashion, eliminating complicated adjustments when reversing or exchanging the plates.

In order to accomplish this object, the invention provides for a recessing tool of the type initially mentioned with the cutting plates, possibly using shortened block gage like supplemental plates, being clamped against the bottom and one side wall of the opening by means of an essentially L-shaped frame element. The frame element overlaps the plate or the plate package from above and extends on one side thereof with a clamping pressure component lateral to the side wall via a wedge ramp. Adjusting ribs engage into the fitting grooves of all of the plates, such adjusting ribs being arranged on the bottom of the recess and/or the bottom side of the upper leg of the frame.

The fitting grooves in the invention which, in the preferred case of reversing plates, are centrally arranged and ground formfit in relationship to the cutting edges resulting in a very simple accuracy of the system without the need for even the slightest adjustments, when used in combination with the supplement plates between the various cutting plates.

The clamping pressure lateral to the side wall can be provided according to a first embodiment of the invention by arranging a non-self-clamping wedge between the leg of the frame, located lateral to the plate or the plate package and becoming slopingly larger in a downward direction, and the opposite wall of the recess. When mounting this clamping wedge by a clamping screw, the upper leg of the frame is pressed against the upper sides of the plates and the lateral leg of the frame is pressed against the exterior surface, producing a mounting against the side wall.

The interior angle of the frame in the invention is somewhat less than 90°, enabling the frame to arrange itself in a master collet fashion around the reversing plate package. The upper clamping leg of the frame is first pushed in a downward direction at the end, located preferably lateral next to the plate package on the holder, and only following this pressing of the upper clamping leg against the plate package is the compression above the lateral wedge leg accomplished.

The mounting of the clamping wedge in the recess is most easily accomplished by a clamping screw which can, for example, be screwed into a screw thread laterally located next to the clamping wedge; the clamping screw either overlapping the clamping wedge with its head, or engaging to a lateral groove of the clamping wedge. In order to avoid lateral displacement of the clamping wedge and to assure a particularly simple mounting, a guiding bolt can be provided which is fastened in the holder and is received within a bore of the clamping wedge from below.

Although not necessary for most ranges of application, a second clamping screw can be provided to additionally increase the clamping safety, fastening the free end of the upper clamping leg of the frame located next to the recess on the holder. The fastening of this screw, which has to intersect the upper clamping leg via an oblong hole in order to enable the compression of the plate package, is done only after the clamping wedge has been mounted.

According to another embodiment of the invention, the clamping power components of the frame lateral to the side wall can be generated by providing a transverse mounting cam at the free end of the leg of the frame overlapping the plate or the plate package from above, the cam being supported by a wedge ramp of the holder, and with a clamping screw intersecting the leg via an oblong hole between this ramp and the side wall in a screw thread of the holder. In this embodiment in which the leg of the tension frame located lateral to the plate package can be relatively short, it is particularly favorable if the transverse mounting cam is formed by a screw thread with a conical tip.

The adjusting rib should preferably be formed in relationship to a base plate which fills the basic area of the recess, and is held by a screw intersecting it, preferably the guiding element of the clamping wedge, so that the mounting grooves have to be arranged correspondingly on the bottom side of the plates.

Additional advantages, characteristics and details of the invention can be seen from the following description of a couple of embodiments, as well as from the drawing.

BRIEF DESCRIPTION OF THE DRAWINGS

FIG. 3 is a sectional view along the line III—III in FIG. 1.

FIGS. 4 to 7 are partial sectional side views of a reversing plate with different fitting grooves.

FIG. 8 is a top view of a reversing plate.

DESCRIPTION OF THE PREFERRED EMBODIMENT

Figure 1:
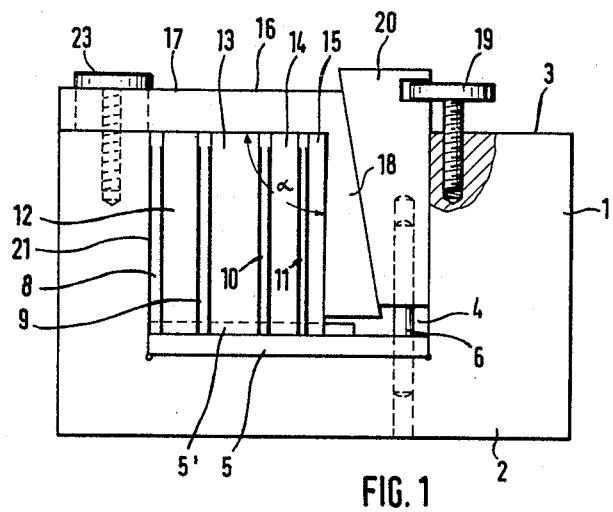
FIG. 1 is a front view of a multiple recessing tool according to the invention.

A recess 4 is arranged in holder 1 and is open towards the work end face 2 as well as at its upper side 3. A base plate 5 is arranged on its bottom and held by an intersecting pin or bolt 6, the upper side of the plate having adjusting ribs 5'. Adjusting rib 5' engages into fitting grooves 7 in cutting plates 8 to 11 formed as reversible plates, and are held by block gage-like supplemental plates 12 to 14 as well as a protective outer supplemental plate 15 held by frame 16. The frame 16 is essentially L-shaped with the upper clamping leg 17 resting on the plate package while the second leg 18, which enlarges slopingly towards its free end, is laterally disposed adjacent to the plate package. The frame 16 is mounted by a non-self-clamping clamping wedge 20 which is pulled downward by a clamping screw 19. The holder 1 and the clamping wedge 20 constitute a holder means. The frame 16 has an interior angle of somewhat less than 90°. Thus, it is achieved that the upper clamping leg 17 is first pushed downward with its end exerting pressure on the entire plate package before the pressing together of the plate package occurs in the direction of side wall 21 of recess 4. By formfit grinding of recess 7 in relationship to the cutting edges 22 of the recessing plates formed as reversable plates (compare particularly FIGS. 3 and 4), an accurate system results, that is accurate when reversing as well as exchanging the plates and without the need for any kind of adjustments.

Figure 2:
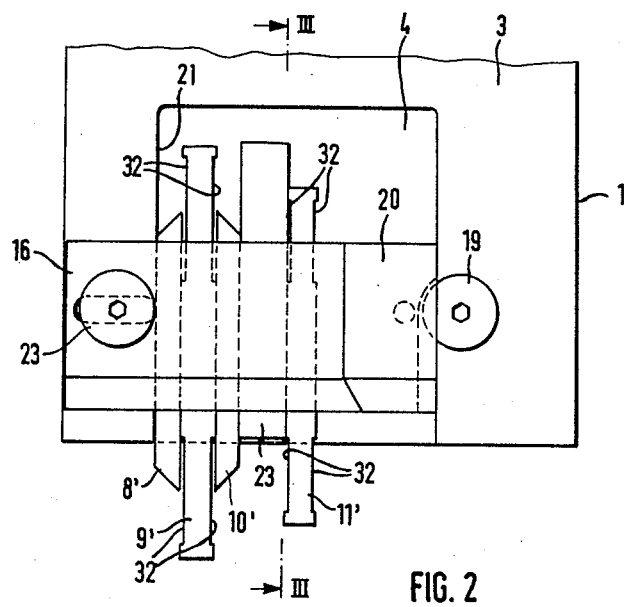
FIG. 2 is a top view of a variation of a multiple recessing tool.

FIG. 2 shows a multiple recessing tool in which the recessing plates 8' and 10' cut the edges of the grooves which have been cut into the piece of metal by the recessing plate 9' while, at a distance from it, as provided by the block gage-like supplemental plate 23, recessing plate 11' cuts an additional but less deep groove into the piece of metal.

FIGS. 4 to 7 show various forms of the fitting grooves 7, 7', 7'', and 7''', with the broken line in FIGS. 4 and 5 indicating the possibility of placing these grooves on the upper side of the recessing plates which, however, would necessitate the forming of adjusting rib 5' on the bottom side of leg 17.

Figure 9:
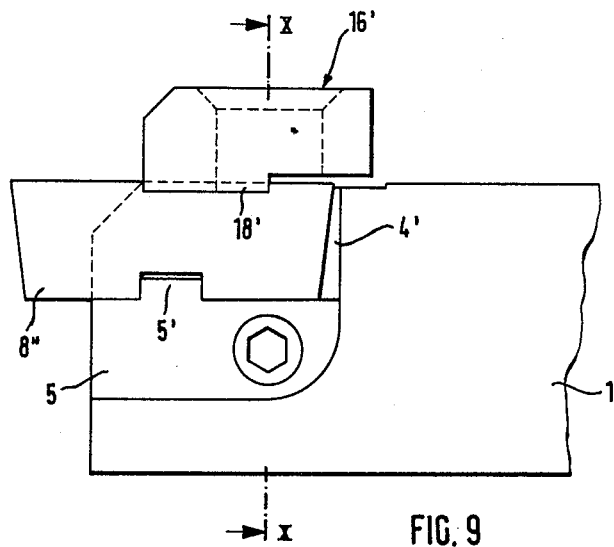
FIG. 9 is a side view of a single recessing tool according to the invention with a three-sided open recess of the holder to receive the cutting plate.
Figure 10:
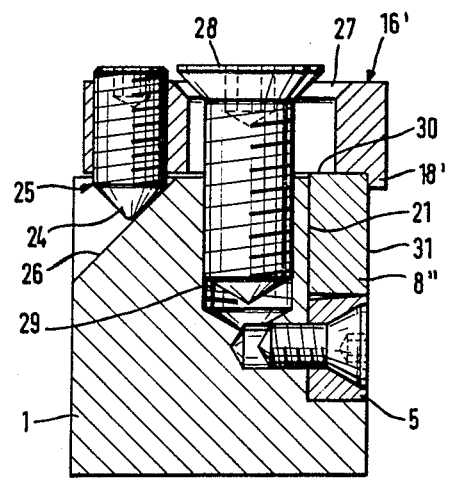
FIG. 10 is a sectional view along the line X—X in FIG. 9.

FIGS. 9 and 10 show a single recessing tool with a recess 4' open on three sides of holder 1. The frame 16' on the end opposite to the shortened leg 18', which is adjacent to the side surface of cutting element 8'', is provided with a transverse mounting cam 25 formed by a screw thread with a conical tip 24, the cam being supported by a diagonal ramp 26 of holder 1. The frame 16' and transverse mounting cam 25 constitute a frame means. When mounting frame 16' by a clamping screw 28 engaging into an elongated hole 27, the screw engages a screw thread 29 between the ramp 26 and the side wall 21 of the recess 4. The result is the providing of clamping power onto the upper side 30 of cutting plate 8'' together with clamping power components of frame 16' onto the exterior surface 31 of cutting plate 8'' and thus a mounting in the direction of side wall 21 of recess 4'.

For the packaging of the plates in multiple recessing tools, it is not only important that the middle part of the plates and the cutting ends have exactly the same thickness (as indicated in FIG. 8), but it is also favorable if recesses 32 are provided between the formfit middle portion and the cutting ends so that the plates adjacent to the cutting edges are free on the side and do not touch the neighboring plate. This would obviously also enable the use of cutting plates in which the aforementioned requirement of the same width of the middle stacked portions of the plates and the cutting edges 22 are not met. The cutting edges can have a somewhat larger width, since they are to be located in the area of the recesses 32 of the neighboring plates.

I claim:

1. A tool mounting comprising a holder element having a recess, an elongated cutting plate mounted in said recess, said holder element having a first and second side wall between which said cutting plate is mounted, a substantially L-shaped frame element mounted on said holder element, said L-shaped frame element having a first leg disposed over said cutting plate and a second leg spaced from said second side wall, said second leg having a sloping surface, a wedge element disposed between said second leg and said second side wall, said wedge element having an inclined surface, said inclined surface of said wedge element engaging said sloping surface to provide a wedging action to thereby laterally clamp and wedge said cutting plate against said first side wall, a first clamping screw engaging said frame element and threaded into said holder element to secure said frame element on said holder element, a second clamping screw threaded into said holder element and operably engaging said wedge element to dispose said wedge element toward the bottom of said recess, said elongated cutting plate having a generally longitudinal axis extending along the longitudinal length thereof and having a cutting edge on at least one longitudinal end thereof, said cutting plate having a transverse groove extending generally transversely of said longitudinal axis, and a rib element on said holder element extending generally transversely of said longitudinal axis, said rib element being engaged by said groove, said cutting plate being slideable transversely of said longitudinal axis as said rib element slides in said groove, whereby said engaged groove and rib element establish the longitudinal position of said cutting plate on said holder element.

2. A tool mounting according to claim 1, wherein said rib element is disposed in the bottom of said recess.

3. A tool mounting according to claim 1, wherein a plurality of cutting plates are mounted in said recess, and further comprising supplemental plates disposed between said cutting plates.

4. A tool mounting according to claim 1, wherein the interior angle between said first and second legs is less than ninety degrees.

5. A tool mounting according to claim 1, wherein said second clamping screw has an enlarged head, said wedge element having a groove engaged by said head.

6. A tool mounting according to claim 1 further comprising a guiding element secured to said holder element, said wedge element having a guiding passageway for receiving said guiding element.

7. A tool mounting according to claim 9, wherein said groove is located on the bottom of said cutting plate.

8. A tool mounting according to claim 9, wherein said cutting plate has a central longitudinal mounting section and lateral recesses between said cutting edges and said mounting section.

9. A tool mounting according to claim 1, wherein said cutting plate has a cutting edge at both longitudinal ends thereof, said transverse groove being located midway between said two cutting edges, whereby said cutting plate is reversibly mountable on said holder element in two mounting dispositions with said engaged groove and rib element establishing the same position for both of said cutting edges relative to said holding element in both mounting dispositions.

* * * * *